US010871370B2

(12) United States Patent
Ishinabe et al.

(10) Patent No.: US 10,871,370 B2
(45) Date of Patent: Dec. 22, 2020

(54) MEASUREMENT DEVICE

(71) Applicant: TOPCON CORPORATION, Tokyo (JP)

(72) Inventors: Ikuo Ishinabe, Tokyo (JP); Fumio Ohtomo, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 408 days.

(21) Appl. No.: 15/909,461

(22) Filed: Mar. 1, 2018

(65) Prior Publication Data

US 2018/0266818 A1 Sep. 20, 2018

(30) Foreign Application Priority Data

Mar. 2, 2017 (JP) .................... 2017-39551

(51) Int. Cl.
| | | |
|---|---|---|
| *G01C 3/00* | (2006.01) | |
| *G01C 3/08* | (2006.01) | |
| *G01S 17/08* | (2006.01) | |
| *G01B 11/02* | (2006.01) | |
| *G01C 15/00* | (2006.01) | |
| *G01S 7/497* | (2006.01) | |
| *G01S 17/42* | (2006.01) | |
| *G01S 7/51* | (2006.01) | |

(Continued)

(52) U.S. Cl.
CPC .............. *G01C 3/08* (2013.01); *G01B 11/026* (2013.01); *G01C 15/002* (2013.01); *G01S 7/4814* (2013.01); *G01S 7/4816* (2013.01); *G01S 7/497* (2013.01); *G01S 7/51* (2013.01); *G01S 17/08* (2013.01); *G01S 17/42* (2013.01); *G01S 17/86* (2020.01)

(58) Field of Classification Search
CPC ......... G01C 3/08; G01C 15/002; G01S 17/86; G01S 7/497; G01S 7/51; G01S 17/08; G01S 17/42; G01B 11/026
USPC ........................................... 356/3.01
See application file for complete search history.

(56) References Cited

U.S. PATENT DOCUMENTS 5,486,892 A * 1/1996 Suzuki .................. G02B 7/287
396/271
6,317,199 B1 * 11/2001 Suzuki ..................... G01C 1/02
356/4.01

(Continued)

FOREIGN PATENT DOCUMENTS

| JP | 2005351745 A | 12/2005 |
|---|---|---|
| JP | 4427389 B2 | 3/2010 |

*Primary Examiner* — James R Hulka
(74) *Attorney, Agent, or Firm* — Chiesa Shahinian & Giantomasi PC

(57) ABSTRACT

The measurement device includes a light source that emits the distance measurement light, a focusing member that transmits the reflected distance measurement light and reflects reflected collimated light to form an image of the measurement target object, the reflected collimated light being reflected by the measurement target object and in a wavelength band different from a wavelength band of the reflected distance measurement light, a distance measurement light reception unit that receives the reflected distance measurement light that has been transmitted through the focusing member and the internal reference light, and a collimated light reception unit that receives the reflected collimated light reflected by the focusing member.

11 Claims, 7 Drawing Sheets

(51) Int. Cl.
*G01S 7/481* (2006.01)
*G01S 17/86* (2020.01)

(56) References Cited

U.S. PATENT DOCUMENTS

| | | | | |
|---|---|---|---|---|
| 6,753,951 | B2* | 6/2004 | Fukumoto | G01C 3/08 356/4.01 |
| 9,677,935 | B2* | 6/2017 | Learmonth | G01J 3/10 |
| 9,767,081 | B2* | 9/2017 | Liu | G06F 40/134 |
| 10,337,983 | B2* | 7/2019 | Li | A61B 3/152 |
| 10,393,874 | B2* | 8/2019 | Schmidtke | G01S 7/4811 |
| 2003/0086072 | A1* | 5/2003 | Fukumoto | G01C 3/08 356/4.01 |
| 2015/0286340 | A1* | 10/2015 | Send | G01J 1/0437 345/175 |
| 2016/0003944 | A1* | 1/2016 | Schmidtke | G01S 7/497 356/4.07 |
| 2016/0123809 | A1* | 5/2016 | Learmonth | G01N 21/255 356/454 |
| 2016/0299058 | A1* | 10/2016 | Li | G01B 11/272 |
| 2017/0167868 | A1* | 6/2017 | Hirai | G01S 7/4817 |

* cited by examiner

MEASUREMENT DEVICE

CROSS-REFERENCE TO RELATED APPLICATION

This application is based upon and claims benefit of priority from Japanese Patent Application No. 2017-39551, filed Mar. 2, 2017, the entire contents of which are incorporated herein by reference.

TECHNICAL FIELD

The present invention relates to a measurement device that irradiates a measurement target object with distance measurement light to measure a distance to the measurement target object.

BACKGROUND

Japanese Patent No. 4427389 discloses a measurement device that irradiates a measurement target object with a laser beam to perform optical distance measurement. In the measurement device disclosed therein, reflected distance measurement light, reflected by the measurement target object, is reflected by a dichroic mirror to be received by a distance measurement light reception unit. The distance to the measurement target object is measured based on a light reception result of the reflected distance measurement light and a light reception result of internal reference light obtained by the distance measurement light reception unit.

Natural light from the measurement target object is transmitted through the dichroic mirror to be incident on an erect image prism. A focusing lens is adjusted along an optical axis so that an erect image is formed on a reticle. The image on the reticle is visible by a measurer through an eyepiece. An optical image corresponding to a part of the natural light, split by the erect image prism, is formed on an image light reception unit disposed at a conjugate position with respect to the reticle. An image signal corresponding to the image on the image light reception unit is transmitted to a control/calculation unit via an image processing unit, and is then displayed as an image in a collimating range.

SUMMARY OF THE EMBODIMENTS

In the measurement device disclosed in PTL1, the focusing lens is adjusted along the optical axis so that the erect image, corresponding to the natural light from the measurement target object that has been transmitted through the dichroic mirror, is formed on the reticle and on the image light reception unit that is disposed at the conjugate position with respect to the reticle. Unfortunately, the number of optical parts, such as the focusing lens, is difficult to reduce from such a configuration. Thus, there is a room for improvement for achieving a measurement device with a smaller size and a lighter weight.

The present invention is made to solve the problem described above, and an object of the present invention is to provide a measurement device that can have a smaller number of optical parts, or achieve a smaller size and a lighter weight.

Means to Solve the Problem

The problem described above can be solved by a measurement device according to the present invention that irradiates a measurement target object with distance measurement light and measures a distance to the measurement target object based on reflected distance measurement light that is the distance measurement light reflected on the measurement target object and internal reference light, and includes a light source that emits the distance measurement light, a focusing member that transmits the reflected distance measurement light and reflects reflected collimated light to form an image of the measurement target object, the reflected collimated light being reflected by the measurement target object and in a wavelength band different from a wavelength band of the reflected distance measurement light, a distance measurement light reception unit that receives the reflected distance measurement light that has been transmitted through the focusing member and the internal reference light, and a collimated light reception unit that receives the reflected collimated light reflected by the focusing member.

In the above-described configuration, the focusing member transmits the reflected distance measurement light, which is the distance measurement light emitted from the light source and reflected by the measurement target object. The focusing member reflects the reflected collimated light, in the wavelength band different from that of the reflected distance measurement light, reflected by the measurement target object. Thus, the focusing member functions as a transmissive member in a distance measurement light path, and functions as a reflecting member in a collimated light path. The focusing member forms an image of the measurement target object on the collimated light reception unit that receives the reflected collimated light reflected by the focusing member. The configuration with the focusing member transmitting the reflected distance measurement light and reflecting the reflected collimated light as described above does not require a focusing lens such as a concave lens for forming an image of the measurement target object on the distance measurement light reception unit that receives the reflected distance measurement light and the internal reference light. Thus, the number of optical members can be reduced. The configuration with the focusing member reflecting the reflected collimated light can have an optical system with the collimated light reception unit disposed more on the inner side than the focusing member. Thus, the measurement device can have a shorter total length than in a configuration where the reflected collimated light is transmitted through a dichroic mirror, a dichroic prism, and the like. Thus, the measurement device with a smaller size and a lighter weight can be achieved.

Preferably, the measurement device further includes a reflection mirror that is disposed on an optical path between the focusing member and the collimated light reception unit, disposed on an optical axis on which the focusing member is also disposed, and reflects the reflected collimated light that has been reflected by the focusing member, toward the collimated light reception unit.

In the above-described configuration, the measurement device further includes a reflection mirror. The reflection mirror is disposed on the optical path between the focusing member and the collimated light reception unit, and is disposed on the optical axis on which the focusing member is also disposed. The reflection mirror reflects the reflected collimated light, which has been reflected by the focusing member, toward the collimated light reception unit. Thus, the reflected collimated light is reflected by the focusing member and the reflection mirror that are both disposed on the optical axis. Thus, an image of the measurement target object can be formed on the collimated light reception unit with the focusing member moving by a distance that is approximately half of that in a configuration without the reflection mirror. Thus, the total length of the measurement device can be further reduced, whereby the measurement device with a smaller size and a lighter weight can be achieved. Furthermore, the configuration ensures a lower risk of causing an error in a line of sight.

Preferably, the collimated light reception unit is an image sensor that converts brightness of the image formed by the focusing member, indicated by the reflected collimated light, into an electric signal.

In the above-described configuration, the collimated light reception unit is an image sensor, and thus optical parts, such as an eyepiece or a reticle, used by a measurer to visually check an image are not required. Thus, the number of optical parts can be reduced and the total length of the measurement device can be reduced, whereby the measurement device with a smaller size and a lighter weight can be achieved.

Preferably, the focusing member is a bandpass filter that transmits light in the wavelength band corresponding to the reflected distance measurement light.

In the above-described configuration, the focusing member is a bandpass filter, and thus can move along the optical axis of the collimated light path to form an image of the measurement target object on the collimated light reception unit without largely affecting an operation of forming the image of the measurement target object on the measurement light reception unit.

Preferably, the focusing member is a semitransparent mirror that reflects light in the wavelength band corresponding to the reflected collimated light.

In the above-described configuration, the focusing member is a semitransparent mirror, and thus can move along the optical axis of the collimated light path to form an image of the measurement target object on the collimated light reception unit without largely affecting an operation of forming the image of the measurement target object on the measurement light reception unit.

The present invention can provide a measurement device that can have a smaller number of optical parts, or achieve a smaller size and a lighter weight.

DESCRIPTION OF THE EMBODIMENTS

Figure 1:
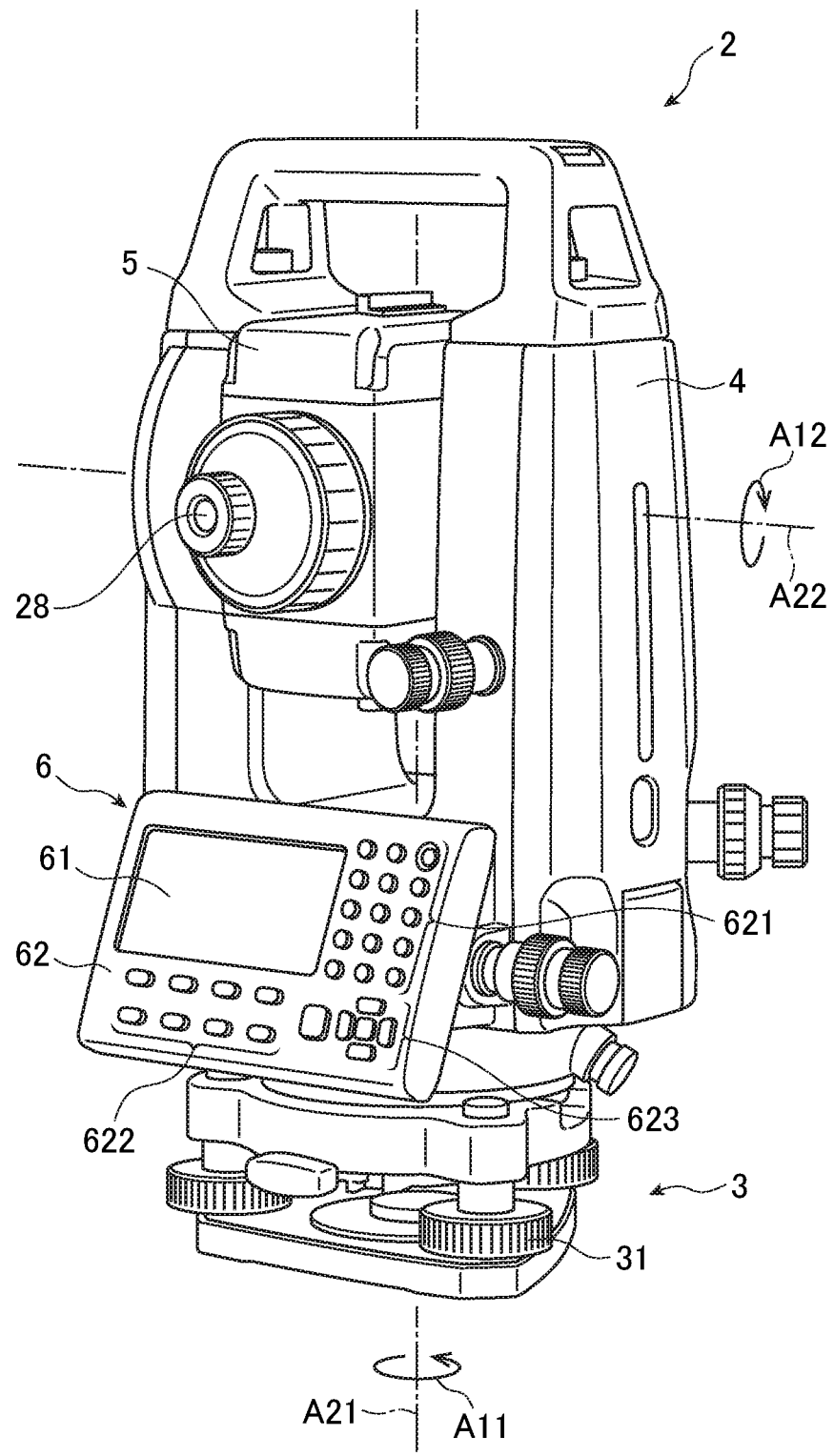
FIG. 1 is a perspective view of a measurement device according to an embodiment of the present invention.

A preferred embodiment of the present invention is described below with reference to the drawings.

The embodiment described below is a specific preferred example of the present invention with various technically preferable limitations. However, the present invention is not limited to these modes unless otherwise stated in the following description. In the figures, the same components are denoted with the same reference numerals, and detailed description thereof will not be given redundantly.

Figure 2:
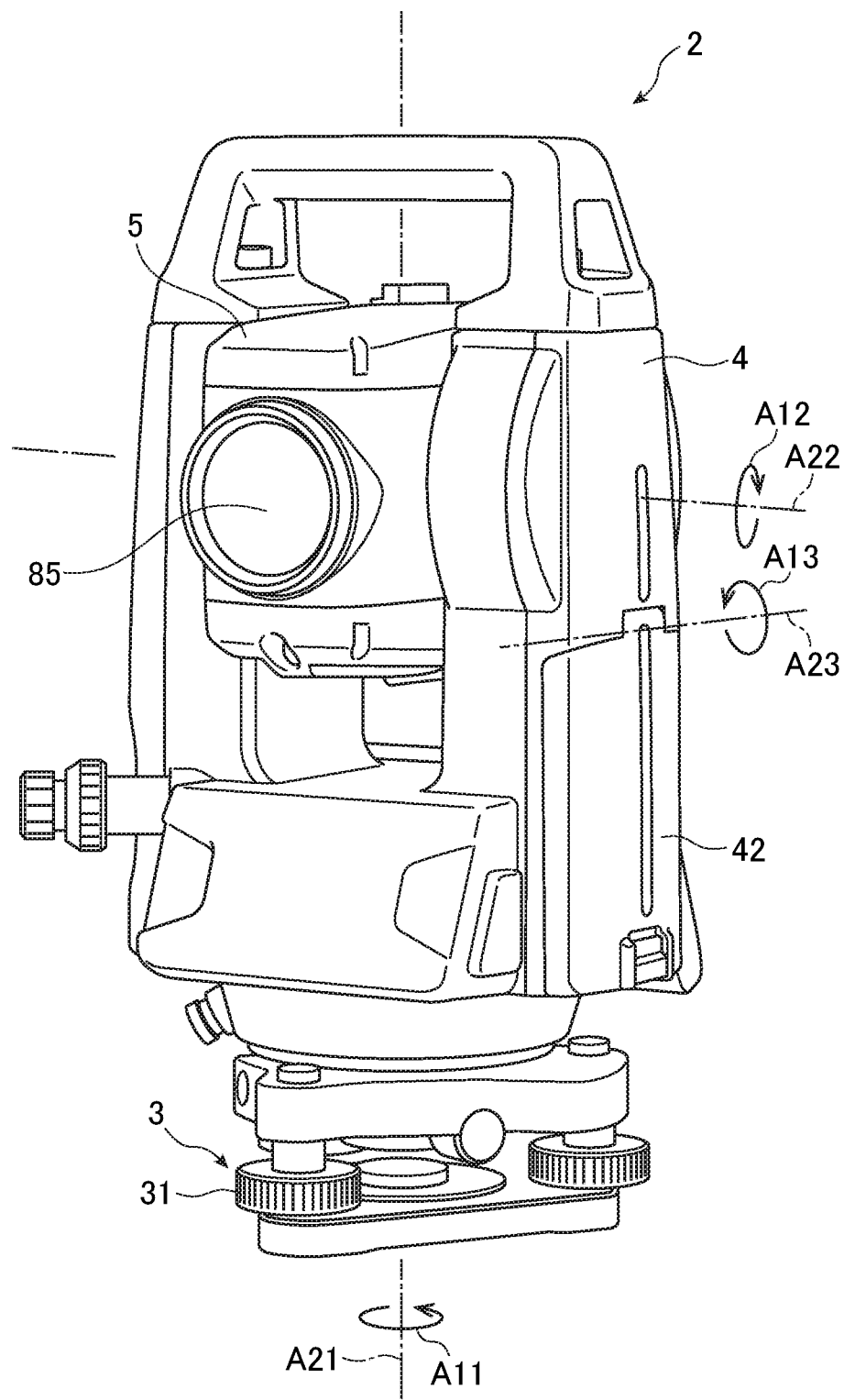
FIG. 2 is a perspective view of the measurement device according to the embodiment of the present invention.

FIG. 1 and FIG. 2 are perspective views illustrating a measurement device according to an embodiment of the present invention.

FIG. 1 is a perspective view of a measurement device 2 as viewed from a side provided with an eyepiece 28. FIG. 2 is a perspective view of the measurement device 2 as viewed from a side provided with an objective lens 85.

The measurement device 2 is what is known as a total station for example, and includes an electronic theodolite that detects an angle (vertical angle and horizontal angle) and an electronic distance meter. Thus, the measurement device 2 measures a distance and an angle.

The measurement device 2 illustrated in FIG. 1 and FIG. 2 includes a base unit 3, a frame 4, a telescope unit 5, and an operation/display unit 6. The frame 4 is disposed on a tripod (not illustrated) or the like via the base unit 3 for example. The base unit 3 includes a leveling screw 31. The leveling screw 31 is used for leveling for maintaining a horizontal state of the frame 4. The frame 4 is rotatable about a vertical axis A21 as indicated by an arrow A11 illustrated in FIG. 1 and FIG. 2.

The telescope unit 5 is supported by the frame 4. The telescope unit 5 is rotatable about a horizontal axis A22 as indicated by an arrow A12 illustrated in FIG. 1 and FIG. 2. The telescope unit 5 is provided with the objective lens 85 and the eyepiece 28. The eyepiece 28 is not necessarily required. As described later, in a configuration without the eyepiece 28, a user can visually recognize a measurement target object 9 by checking an image in a collimating range displayed on a display unit 61.

The operation/display unit 6 is provided to the frame 4. As illustrated in FIG. 1, the operation/display unit 6 includes the display unit 61 and an operation input unit 62. The display unit 61 displays information including: a condition at the time of the measurement; results of measuring a distance and an angle; and a result of image processing (an image in the collimating range), for example. The user of the measurement device 2 uses the operation input unit 62 to input a measurement condition or the like to, when measuring a distance and an angle. Specifically, the operation input unit 62 includes a numerical key unit 621, a function selection key unit 622, and a cursor key unit 623. For example, the user uses the function selection key unit 622 to select functions such as a distance measurement mode, an auto-focusing mode, and a manual focusing mode.

As illustrated in FIG. 2, the frame 4 has a side portion provided with a lid member 42. The lid member 42 is rotatable about a horizontal axis A23, as indicated by an arrow A13 illustrated in FIG. 2. The user can take out or put in a battery by opening the lid member 42.

Figure 3:
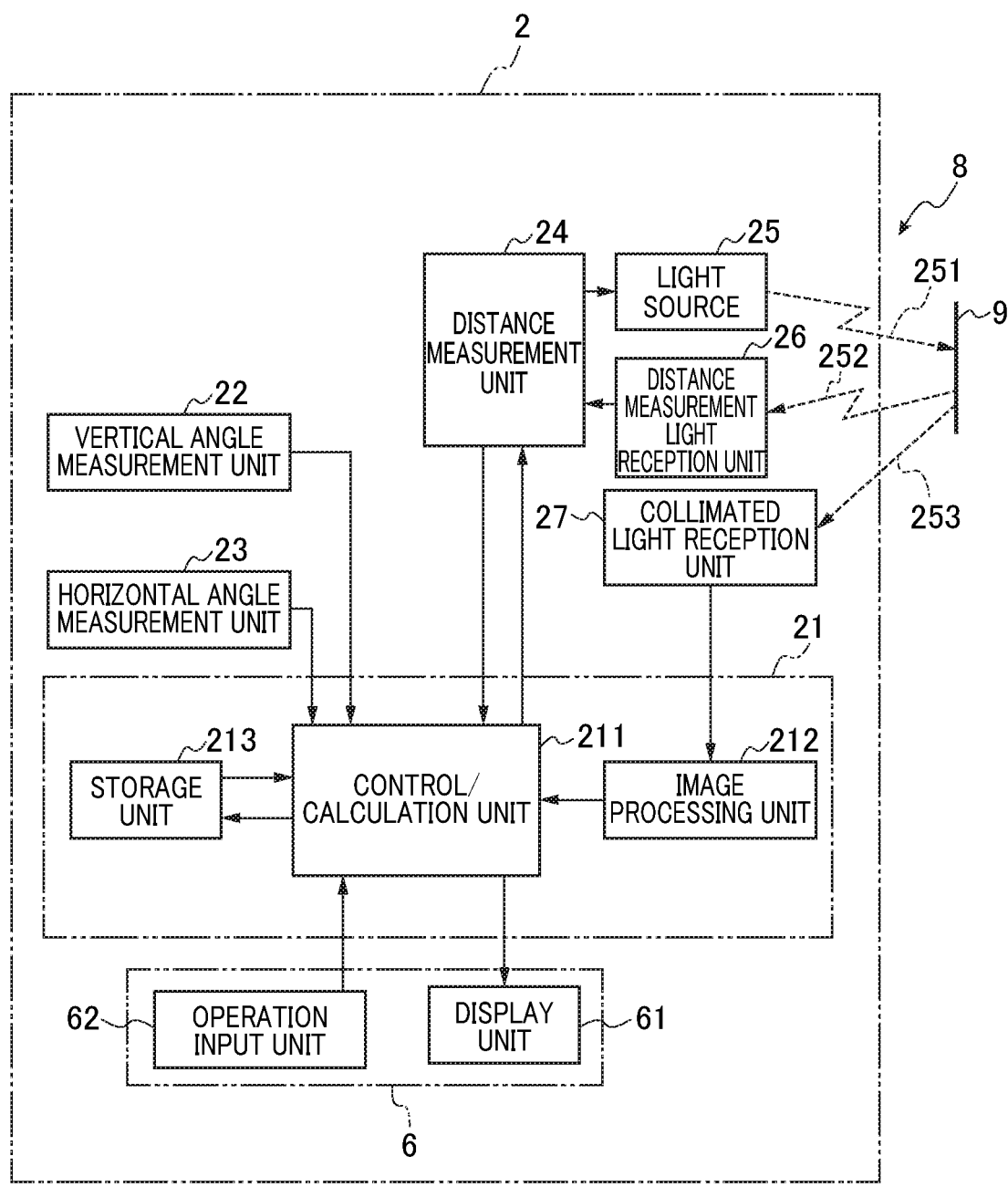
FIG. 3 is a block diagram illustrating a schematic configuration of the measurement device according to the embodiment.

FIG. 3 is a block diagram illustrating a schematic configuration of the measurement device according to the present embodiment.

As illustrated in FIG. 3, the measurement device 2 according to the present embodiment includes a control unit 21, a vertical angle measurement unit 22, a horizontal angle measurement unit 23, a distance measurement unit 24, a light source 25, a distance measurement light reception unit 26, a collimated light reception unit 27, the operation/display unit 6, and an optical system 8. The operation/display unit 6 is as described above with reference to FIG. 1 and FIG. 2.

The control unit 21 includes a control/calculation unit 211, an image processing unit 212, and a storage unit 213. The control/calculation unit 211 is a central processing unit (CPU) and the like for example, and performs processing, based on a signal (instruction) received from the operation input unit 62, including: program booting; signal control processing; calculation; and driving control for the display unit 61, the distance measurement unit 24, and the like. Specifically, the control/calculation unit 211 controls the measurement device 2 as a whole and causes the display unit 61 to display the measurement condition, the measurement result (results of measuring a distance and an angle), the image processing result (an image in the collimating range), and the like.

The control/calculation unit 211 stores an image data signal received from the image processing unit 212 and measurement data (for example, a vertical angle signal received from the vertical angle measurement unit 22, a horizontal angle signal received from the horizontal angle measurement unit 23, and a distance signal received from the distance measurement unit 24), in association with each other, in the storage unit 213.

The image data signal and the measurement data are associated with each other with a recording area, for each measurement point, generated in the storage unit 213 and with an image data signal storage area and a measurement data storage area generated in the recording area. Alternatively, the image data signal and the measurement data may be associated with each other through a known method. Specifically, the association may be achieved with an image data storage area and a measurement data storage area generated in the storage unit 213, the image data signal and the measurement data separately stored in the image data storage area and the measurement data storage area respectively, and management data linking the image data signal and the measurement data with each other generated.

For example, the storage unit 213 stores a sequence program for measurement, an image processing program for image processing, and a calculation program. Examples of the storage unit 213 include a semiconductor memory embedded in the measurement device 2 and various storage media, connectable to the measurement device 2, including a compact disc (CD), a digital versatile disc (DVD), a random-access memory (RAM) a read only memory (ROM), a hard disk, and a memory card.

The vertical angle measurement unit 22 measures a vertical angle relative to the horizontal direction in a state where the measurement target object 9 is collimated with the telescope unit 5, based on a detection signal from a vertical angle encoder that detects a tilted angle of the telescope unit 5. The horizontal angle measurement unit 23 measures a horizontal angle of the measurement target object 9 relative to a reference direction in the state where the measurement target object 9 is collimated with the telescope unit 5, based on a detection signal from a horizontal angle encoder that detects a rotation angle of the frame 4.

The distance measurement unit 24 controls the driving of the light source 25. The light source 25 is disposed in the telescope unit 5, and emits measurement light 251 such as a laser beam for example. The distance measurement light 251 emitted from the light source 25 is emitted onto the measurement target object 9 via the optical system 8 disposed in the telescope unit 5. Reflected measurement light 252, reflected by the measurement target object 9, is received by the measurement light reception unit 26, disposed in the telescope unit 5, via the optical system 8. The measurement light reception unit 26 converts the brightness (light reception result) indicated by the reflected measurement light 252 received, into an electric signal (received light signal), and transmits the received light signal to the distance measurement unit 24. The distance measurement unit 24 calculates the distance to the measurement target object 9 based on the received light signal received from the distance measurement light reception unit 26. The distance measurement unit 24 inputs the result of the calculation to the control/calculation unit 211.

The collimated light reception unit 27 is an image sensor such as a Charge Coupled Device (CCD) or a Complementary Metal Oxide Semiconductor (CMOS) for example, and receives reflected collimated light 253 in a wavelength band different from that of the reflected measurement light 252. The reflected collimated light 253, in a wavelength band different from that of the reflected measurement light 252, is light reflected by the measurement target object 9. Specifically, the collimated light reception unit 27 receives the reflected collimated light 253 reflected by the measurement target object 9 and receives light corresponding to an image of the measurement target object 9. Examples of the reflected collimated light 253 include natural light and infrared light. However, the reflected collimated light 253 is not limited to these. The reflected collimated light 253 is received by the collimated light reception unit 27, disposed in the telescope unit 5, via the optical system 8. The collimated light reception unit 27 converts the brightness (light reception result) indicated by the reflected collimated light 253 into an electronic signal (image signal) and transmits the image signal to the image processing unit 212.

The image processing unit 212 executes image processing on the image signal, received from the collimated light reception unit 27, and transmits the resultant image data to the control/calculation unit 211. The control/calculation unit 211 performs calculation based on the image data signal, received from the image processing unit 212, and controls the display unit 61 to display the image in the collimating range of the telescope unit 5.

Figure 4:
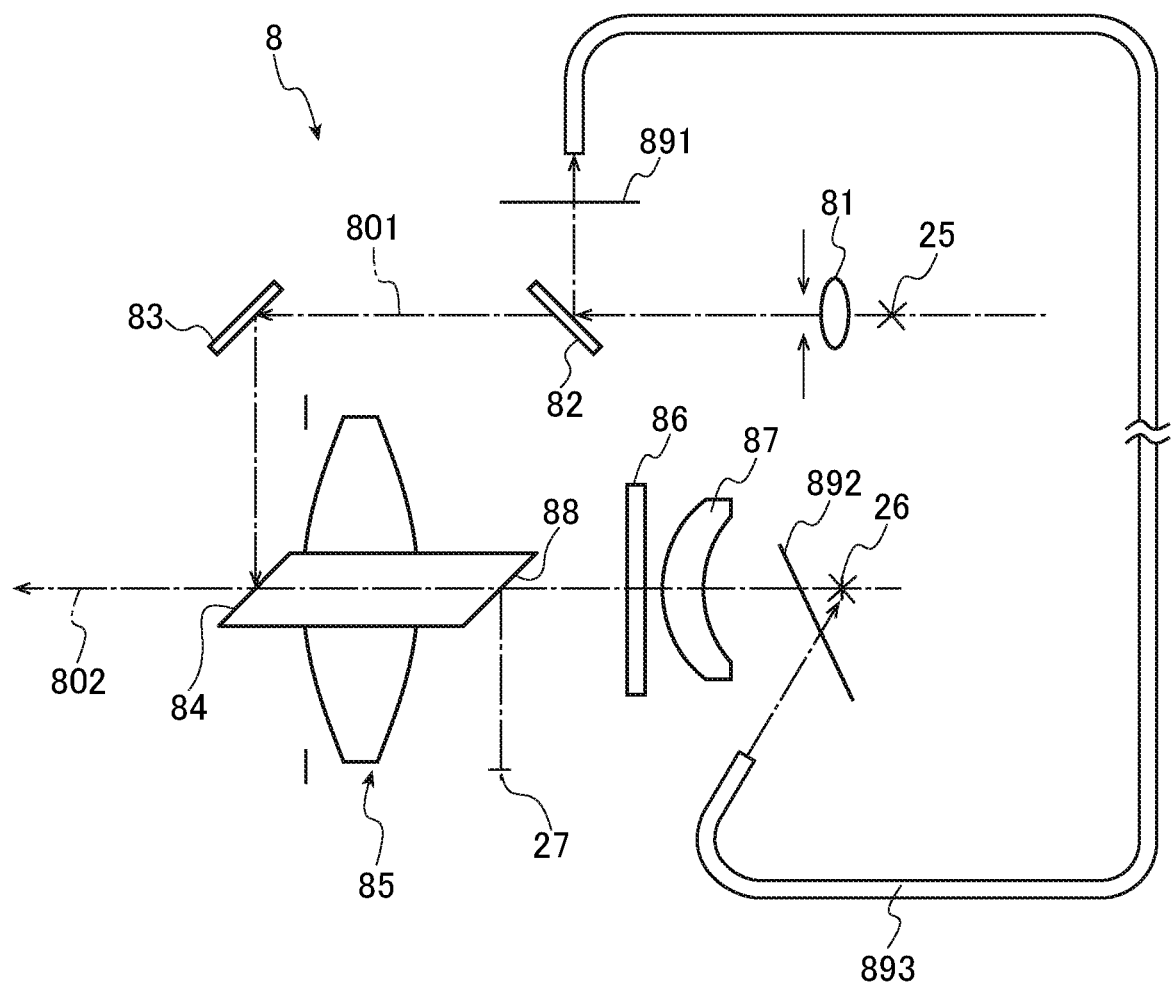
FIG. 4 is a plan view of an optical system according to the embodiment.

FIG. 4 is a plan view of an optical system according to the present embodiment.

The optical system 8 illustrated in FIG. 4 has a collimate lens 81, a semitransparent mirror 82, and a first reflection mirror 83 disposed on a first optical axis 801. A second reflection mirror 84, the objective lens 85, a focusing member 86, a meniscus lens 87, a third reflection mirror (reflection mirror) 88, the distance measurement light reception unit 26, and a second dimming Neutral Density (ND) filter 892 are disposed on a second optical axis 802. The first optical axis 801 is an axis different from the second optical axis 802. Specifically, the first optical axis 801 and the second optical axis 802 are not coaxially arranged. The first optical axis 801 and the second optical axis 802 are parallel to each other.

The collimated light reception unit 27 is disposed on an optical axis of reflected light from the third reflection mirror 88. A first dimming ND filter 891 is disposed on an optical axis of reflected light from the semitransparent mirror 82.

The light source 25 emits the distance measurement light 251, such as a laser beam for example, based on a driving signal received from the distance measurement unit 24. The distance measurement light 251, emitted from the light source 25, is collimated by the collimate lens 81 to be parallel light and travels toward the semitransparent mirror 82. A part of the distance measurement light 251, incident on the semitransparent mirror 82, is transmitted through the semitransparent mirror 82, and is reflected by the first reflection mirror 83 and the second reflection mirror 84 toward the measurement target object 9.

The other part of the distance measurement light 251, incident on the semitransparent mirror 82, is reflected by the semitransparent mirror 82 to be internal reference light, and is transmitted through the first dimming ND filter 891 to enter an optical fiber 893. The internal reference light that has been transmitted through the optical fiber 893 is transmitted through the second dimming ND filter 892 to be received by the distance measurement light reception unit 26. The distance measurement light reception unit 26 converts the brightness (light reception result) indicated by the internal reference light received into an electronic signal (received light signal), and transmits the resultant received light signal to the distance measurement unit 24.

The reflected distance measurement light 252, reflected by the measurement target object 9 and condensed by the objective lens 85, is transmitted through the focusing member 86, is further condensed by the meniscus lens 87, and is then transmitted through the second dimming ND filter 892 to be received by the distance measurement light reception unit 26. The reflected collimated light 253, in a wavelength band different from that of the reflected distance measurement light 252, is condensed by the objective lens 85, reflected by the focusing member 86, and is further reflected by the third reflection mirror 88 to be received by the collimated light reception unit 27. An optical path of the reflected distance measurement light 252 and an optical path of the reflected collimated light 253 are further described below with reference to the drawings.

Figure 5:
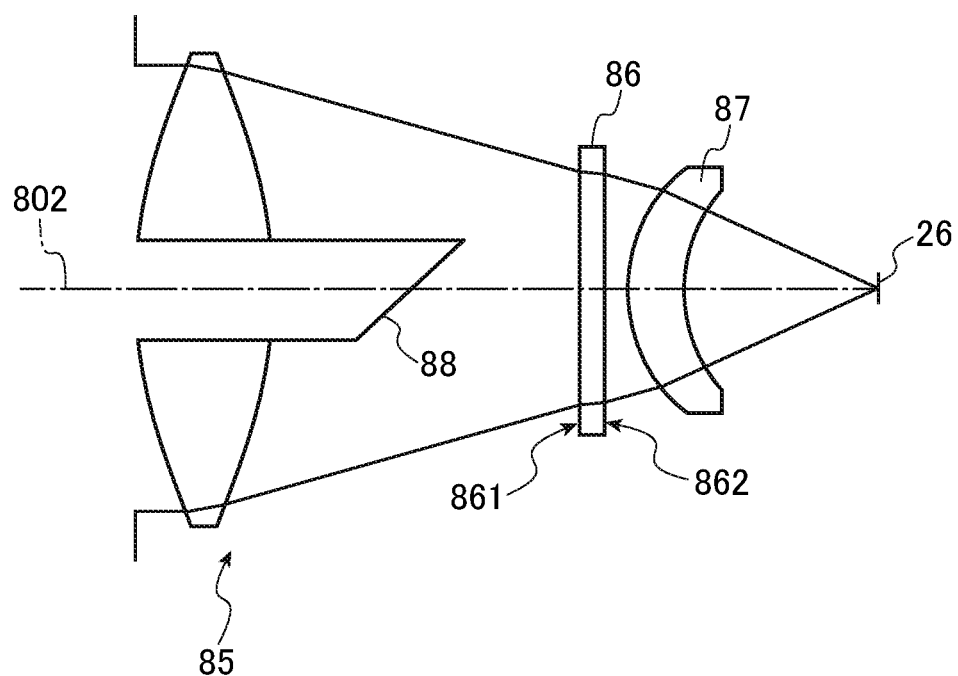
FIG. 5 is a plan view illustrating a distance measurement light path according to the embodiment.

FIG. 5 is a plan view illustrating a distance measurement light path according to the present embodiment.

Figure 6A:
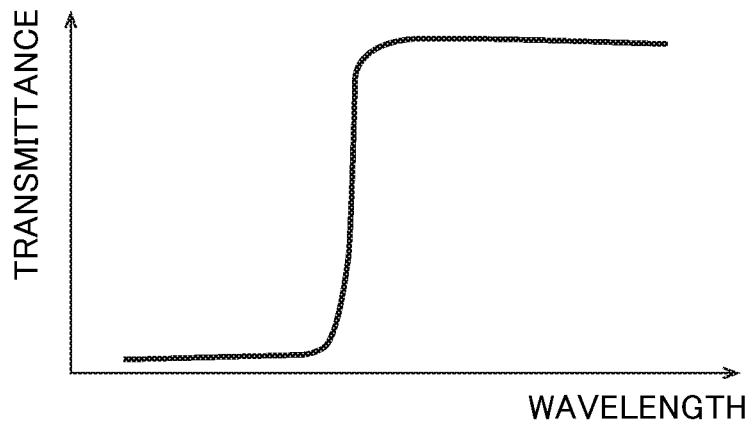
FIGS. 6A to 6C are graphs illustrating examples of the relationship between a wavelength and transmittance of light transmitting through a focusing member.
Figure 6B:
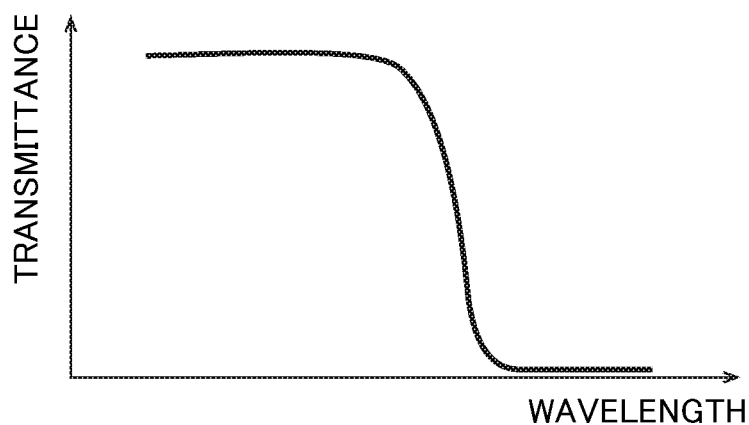
Figure 6C:
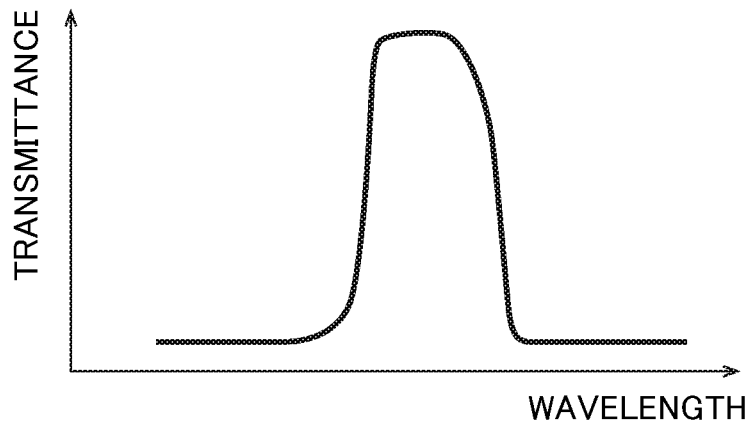

FIGS. 6A to 6C are graphs illustrating an example of relationship between the wavelength and transmittance of light transmitting through the focusing member according to the present embodiment.

In FIG. 5, the second dimming ND filter 892 is omitted for the sake of description.

As illustrated in FIG. 5, the reflected distance measurement light 252 reflected by the measurement target object 9 is condensed by the objective lens 85. The reflected distance measurement light 252, thus condensed by the objective lens 85, is transmitted through the focusing member 86, is further condensed by the meniscus lens 87, and is received by the distance measurement light reception unit 26. Thus, an image of the measurement target object 9 is formed on the distance measurement light reception unit 26.

The focusing member 86 has an incident surface (surface closer to the objective lens 85) provided with a long-pass filter 861. As illustrated in FIG. 6A, the long-pass filter 861 blocks light with a wavelength shorter than a predetermined wavelength and transmits light with a wavelength longer than the predetermined wavelength. The focusing member 86 has an exit surface (surface closer to the distance measurement light reception unit 26) provided with a short-pass filter 862. As illustrated in FIG. 6B, the short-pass filter 862 blocks light with a wavelength longer than the predetermined wavelength and transmits light with a wavelength shorter than the predetermined wavelength. With the long-pass filter 861 and the short-pass filter 862 thus provided to both surfaces of the focusing member 86, the focusing member 86 according to the present embodiment functions as a bandpass filter that transmits light with a wavelength corresponding to that of the reflected distance measurement light 252, as illustrated in FIG. 6C.

The long-pass filter 861 may be provided on the exit surface (the surface closer to the distance measurement light reception unit 26) of the focusing member 86 depending on the wavelength band of the reflected collimated light 253. The short-pass filter 862 may be provided on the incident surface (the surface closer to the objective lens 85) of the focusing member 86 depending on the wavelength band of the reflected collimated light 253.

As described above with reference to FIG. 3 and FIG. 4, the distance measurement light reception unit 26 converts the brightness (light reception result) indicated by the reflected distance measurement light 252 and the internal reference light received into the electric signals (received light signals), and transmits the received light signals to the distance measurement unit 24. The distance measurement unit 24 calculates the distance to the measurement target object 9 based on the received light signal, corresponding to the reflected distance measurement light 252, received from the distance measurement light reception unit 26 and the received light signal, corresponding to the internal reference light, received from the distance measurement light reception unit 26.

Figure 7:
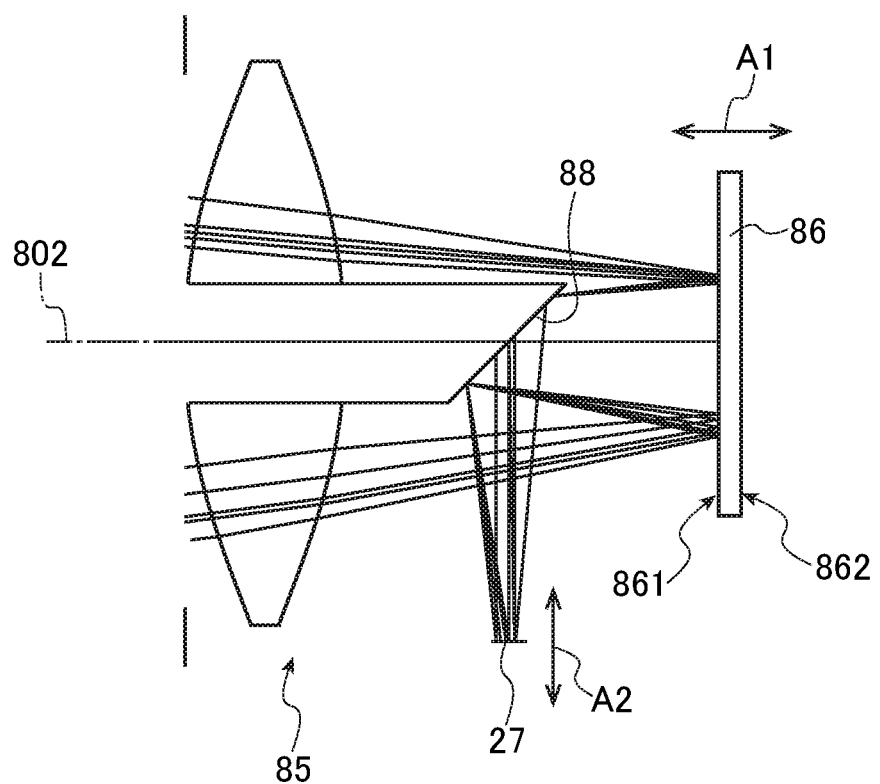
FIG. 7 is a plan view illustrating a collimated light path according to the embodiment.

FIG. 7 is a plan view of the collimated light path according to the present embodiment.

As illustrated in FIG. 7, the reflected collimated light 253, in a wavelength band different from that of the reflected distance measurement light 252, reflected by the measurement target object 9 is condensed by the objective lens 85. The reflected collimated light 253, condensed by the objective lens 85, is blocked by the long-pass filter 861 of the focusing member 86 for example, and is reflected by the focusing member 86. The reflected collimated light 253 may be blocked by the short-pass filter 862 of the focusing member 86 depending on the wavelength of reflected collimated light 253. The reflected collimated light 253 reflected by the focusing member 86 is further reflected by the third reflection mirror 88 toward the collimated light reception unit 27.

The third reflection mirror 88 is provided on an optical path between the focusing member 86 and the collimated light reception unit 27, and reflects the reflected collimated light 253 that has been reflected by the focusing member 86, toward the collimated light reception unit 27. The third reflection mirror 88 according to the present embodiment corresponds to a "reflection mirror" according to the present invention.

The image of the measurement target object 9 is formed on the collimated light reception unit 27 with the focusing member 86 moving along the second optical axis 802 as indicted by an arrow A1 illustrated in FIG. 7. Specifically, the reflected collimated light 253 is reflected by the focusing member 86 and is then further reflected by the third reflection mirror 88 to be received by the collimated light reception unit 27. Thus, the image of the measurement target object 9 is formed on the collimated light reception unit 27. For example, when the focusing member 86 moves toward the distance measurement light reception unit 26 along the second optical axis 802, an image of the measurement target object 9 at a shorter distance is formed on the collimated light reception unit 27 than in a situation before the movement of the focusing member 86. For example, when the focusing member 86 moves toward the objective lens 85 along the second optical axis 802, an image of the measurement target object 9 at a longer distance is formed on the collimated light reception unit 27 than in the situation before the movement of the focusing member 86.

The focusing member 86, which is a plate shaped member serving as a bandpass filter or the like, transmits the reflected distance measurement light 252 but does not have a function of a lens to condense the reflected distance measurement light 252. Thus, the focusing member 86 can move along the second optical axis 802 as indicated by an arrow A1 illustrated in FIG. 7 without largely affecting the operation of forming an image of the measurement target object 9 on the distance measurement light reception unit 26.

The focusing member 86 is not limited to the bandpass filter, and may be a semitransparent mirror that reflects the light in the wavelength band corresponding to that of the reflected collimated light 253. This configuration also enables an image of the measurement target object 9 to be formed on the collimated light reception unit 27 with the focusing member 86 moving along the second optical axis 802 without largely affecting the operation of forming the image of the measurement target object 9 on the distance measurement light reception unit 26. The focusing member 86 does not necessarily need to move. For example, the collimated light reception unit 27 may move along the optical axis of the light reflected by the third reflection mirror 88 as indicted by an arrow A2 illustrated in FIG. 7. This configuration also enables an image of the measurement target object 9 to be formed on the collimated light reception unit 27.

As described above with reference to FIG. 3, the collimated light reception unit 27 converts the brightness (light reception result) indicated by the reflected collimated light 253 into an electric signal (image signal) and transmits the image signal to the image processing unit 212. The control/calculation unit 211 executes calculation based on an image data signal received from the image processing unit 212, and controls the display unit 61 to display an image in the collimating range of the telescope unit 5. Thus, the user can visually check the image in the collimating range displayed on the display unit 61 to visually check the measurement target object 9.

In the measurement device 2 according to the present embodiment, the focusing member 86 transmits the reflected distance measurement light 252, which is the distance measurement light 251 emitted from the light source 25 and reflected by the measurement target object 9. The focusing member 86 reflects the reflected collimated light 253, in the wavelength band different from that of the reflected distance measurement light 252, reflected by the measurement target object 9. Thus, the focusing member 86 functions as a transmissive member in the distance measurement light path illustrated in FIG. 5, and functions as a reflecting member in the collimated light path illustrated in FIG. 7. The focusing member 86 forms an image of the measurement target object 9 on the collimated light reception unit 27 that receives the reflected collimated light 253 reflected by the focusing member 86. The configuration with the focusing member 86 transmitting the reflected distance measurement light 252 and reflecting the reflected collimated light 253 as described above does not require a focusing lens such as a concave lens for forming an image of the measurement target object 9 on the distance measurement light reception unit 26 that receives the reflected distance measurement light 252 and the internal reference light. Thus, the number of optical parts can be reduced. The configuration with the focusing member 86 reflecting the reflected collimated light 253 can have an optical system 8 with the collimated light reception unit 27 disposed more on the inner side than the focusing member 86. Thus, the measurement device 2 can have a shorter total length than in a configuration where the reflected collimated light is transmitted through a dichroic mirror, a dichroic prism, and the like. Thus, the measurement device 2 with a smaller size and a lighter weight can be achieved.

As described above with reference to FIG. 7, the third reflection mirror 88 is disposed on the optical path between the focusing member 86 and the collimated light reception unit 27, and is disposed on the second optical axis 802 on which the focusing member 86 is also disposed. The third reflection mirror 88 reflects the reflected collimated light 253, which has been reflected by the focusing member 86, toward the collimated light reception unit 27. Thus, the reflected collimated light 253 is reflected by the focusing member 86 and the third reflection mirror 88 that are both on the second optical axis 802. Thus, an image of the measurement target object 9 can be formed on the collimated light reception unit 27 with the focusing member 86 moving by a distance that is approximately half of that in a configuration without the third reflection mirror 88. Thus, the total length of the measurement device 2 can be further reduced, whereby the measurement device 2 with a smaller size and a lighter weight can be achieved. Furthermore, the configuration ensures a lower risk of causing an error in a line of sight.

The collimated light reception unit 27 is an image sensor such as a CCD or a CMOS for example, and thus optical parts, such as an eyepiece or a reticle, used by a user (measurer) to visually check an image are not necessarily required. Thus, the number of optical parts can be reduced and the total length of the measurement device 2 can further be reduced, whereby the measurement device 2 with a smaller size and a lighter weight can be achieved.

EXPLANATION OF REFERENCE NUMERALS

2 . . . measurement device, 3 . . . base unit, 4 . . . frame, 5 . . . telescope unit, 6 . . . operation/display unit, 8 . . . optical system, 9 . . . measurement target object, 21 . . . control unit, 22 . . . vertical angle measurement unit, 23 . . . horizontal angle measurement unit, 24 . . . distance measurement unit, 25 . . . light source, 26 . . . distance measurement light reception unit, 27 . . . collimated light reception unit, 28 . . . eyepiece, 31 . . . leveling screw, 42 . . . lid member, 61 . . . display unit, 62 . . . operation input unit, 81 . . . collimate lens, 82 . . . semitransparent mirror, 83 . . . first reflection mirror, 84 . . . second reflection mirror, 85 . . . objective lens, 86 . . . focusing member, 87 . . . meniscus lens, 88 . . . third reflection mirror, 211 . . . control/calculation unit, 212 . . . image processing unit, 213 . . . storage unit, 251 . . . measurement light, 252 . . . reflected measurement light, 253 . . . reflected collimated light, 621 . . . numerical key unit, 622 . . . function selection key unit, 623 . . . cursor key unit, 801 . . . first optical axis, 802 . . . second optical axis, 861 . . . long-pass filter, 862 . . . short-pass filter, 891 . . . first dimming ND filter, 892 . . . second dimming ND filter, 893 . . . optical fiber

What is claimed is:

1. A measurement device that irradiates a measurement target object with distance measurement light and measures a distance to the measurement target object based on reflected distance measurement light that is the distance measurement light reflected on the measurement target object and internal reference light, the measurement device comprising:
a light source that emits the distance measurement light;
a focusing member that transmits the reflected distance measurement light and reflects reflected collimated light to form an image of the measurement target object, the reflected collimated light being reflected by the measurement target object and in a wavelength band different from a wavelength band of the reflected distance measurement light;

a distance measurement light reception unit that receives the reflected distance measurement light that has been transmitted through the focusing member and the internal reference light;

a collimated light reception unit that receives the reflected collimated light reflected by the focusing member;

a reflection mirror that is disposed on an optical path between the focusing member and the collimated light reception unit, disposed on an optical axis on which the focusing member is also disposed, and reflects the reflected collimated light that has been reflected by the focusing member, toward the collimated light reception unit; and an objective lens that is disposed on the optical axis, wherein the focusing member is a plate shaped member that does not condense the reflected distance measurement light, the focusing member transmits the reflected distance measurement light and causes the distance measurement light reception unit to receive the reflected distance measurement light, the reflected distance measurement light being reflected by the measurement target object and condensed by the objective lens, and the focusing member reflects the reflected collimated light and causes the reflection mirror to further reflect the reflected collimated light and causes the collimated light reception unit to receive the reflected collimated light, the reflected collimated light being reflected by the measurement target object and condensed by the objective lens.

2. The measurement device according to claim 1, wherein the collimated light reception unit is an image sensor that converts brightness of the image formed by the focusing member, indicated by the reflected collimated light, into an electric signal.

3. The measurement device according to claim 2, wherein the focusing member is a bandpass filter that transmits light in the wavelength band corresponding to the reflected distance measurement light.

4. The measurement device according to claim 2, wherein the focusing member is a semitransparent mirror that reflects light in the wavelength band corresponding to the reflected collimated light.

5. The measurement device according to claim 1, wherein the focusing member is a bandpass filter that transmits light in the wavelength band corresponding to the reflected distance measurement light.

6. The measurement device according to claim 1, wherein the focusing member is a bandpass filter that transmits light in the wavelength band corresponding to the reflected distance measurement light.

7. The measurement device according to claim 1, wherein the collimated light reception unit is an image sensor that converts brightness of the image formed by the focusing member, indicated by the reflected collimated light, into an electric signal.

8. The measurement device according to claim 1, wherein the focusing member is a semitransparent mirror that reflects light in the wavelength band corresponding to the reflected collimated light.

9. The measurement device according to claim 1, wherein the focusing member is a semitransparent mirror that reflects light in the wavelength band corresponding to the reflected collimated light.

10. The measurement device according to claim 1, wherein the collimated light reception unit forms an image of the measurement target object on the collimated light reception unit with moving along an optical axis of the light reflected by the reflection mirror.

11. The measurement device according to claim 1, wherein the focusing member forms an image of the measurement target object on the collimated light reception unit with moving along the optical axis.

* * * * *